United States Patent

Boston

[15] 3,689,927
[45] Sept. 5, 1972

[54] RADIO-CONTROLLED DECOY

[72] Inventor: Robert T. Boston, 9713 1/2 Longden Ave., Tample City, Calif. 91780

[22] Filed: July 8, 1971

[21] Appl. No.: 160,801

[52] U.S. Cl. ..................................343/225, 43/3
[51] Int. Cl. ........................H04b 7/00, A01m 31/06
[58] Field of Search .........343/225, 228; 43/3; 46/92, 46/245

[56] References Cited

UNITED STATES PATENTS 3,074,195   1/1963   Vanderpool.....................43/3

*Primary Examiner*—Donald J. Yusko
*Attorney*—Wm. Jacquet Gribble

[57] ABSTRACT

A water fowl decoy contains a radio receiver adapted to receive signals from a remote radio transmitter. The receiver connects to an amplifier, one or more servos and other components within the decoy. A rudder operable by a servo steers the decoy. An electric motor drives a propeller to motivate the decoy. A folded or recessed grapple is extended when a servo mechanism within the decoy responds to a signal from the transmitter through the receiver. The decoy carries a battery pack and internal flotation.

7 Claims, 7 Drawing Figures

INVENTOR:
ROBERT T. BOSTON
BY
W. J. Gribble
ATTORNEY

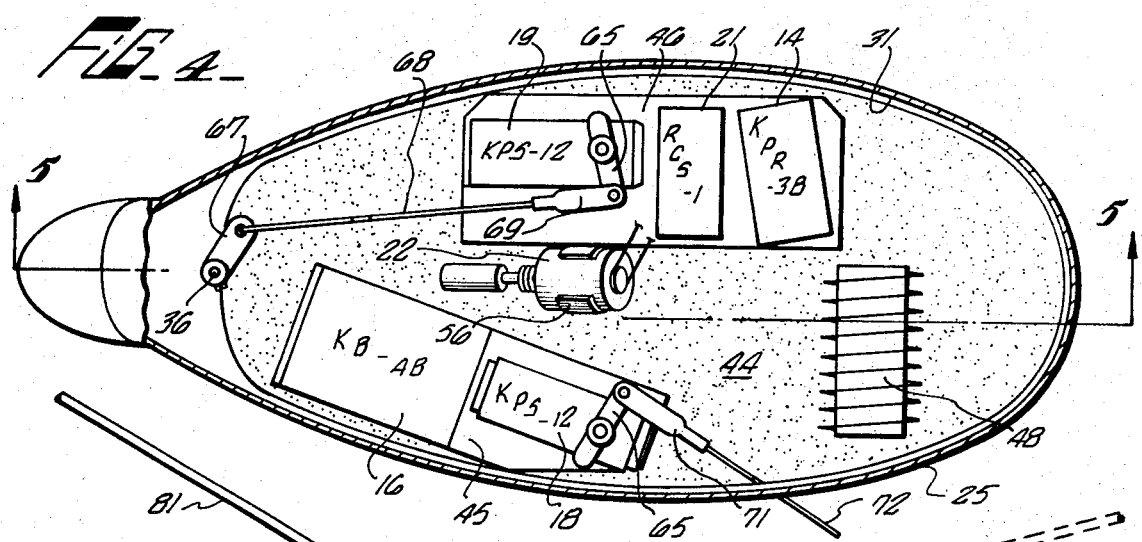
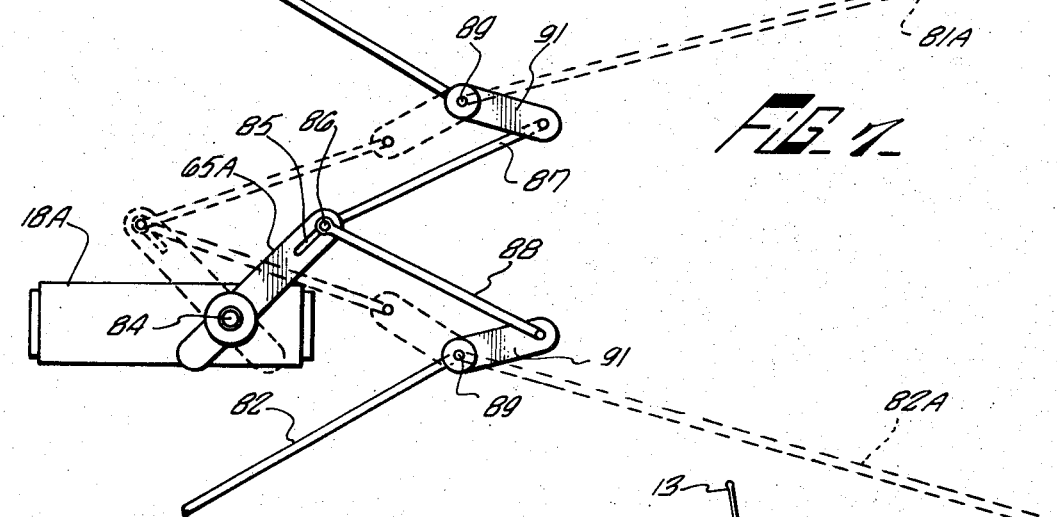
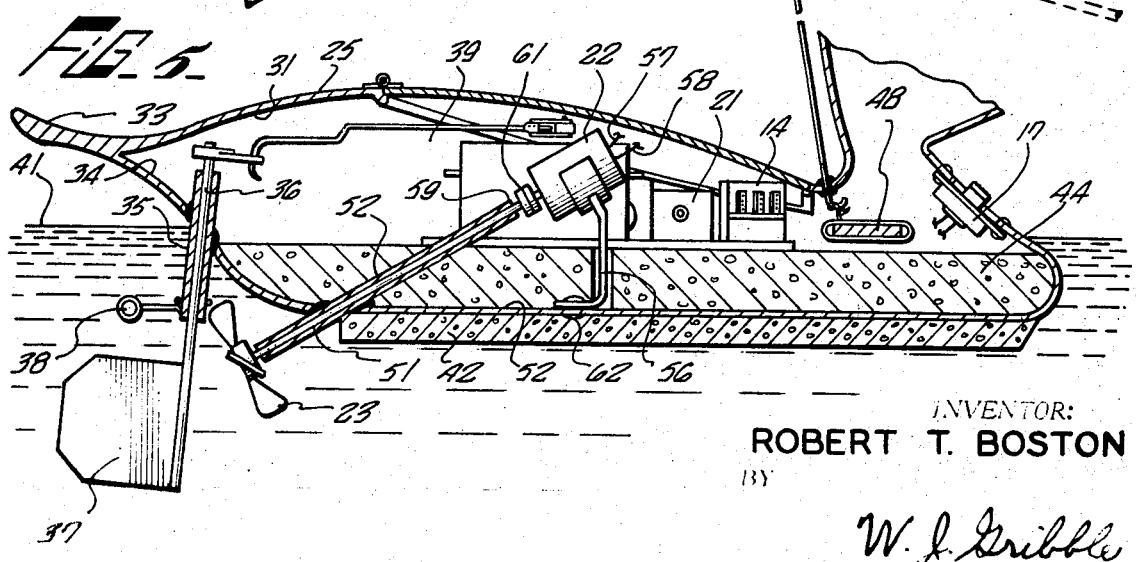

RADIO-CONTROLLED DECOY

BACKGROUND OF THE INVENTION

The invention relates to hunters' decoys, and more particularly to floating decoys which are radio-controlled.

Previous decoys have operated from battery motors to simulate feeding waterfowl on the water surface. Such decoys have had rudders which are manually preset to program the decoy for a circular path within the water body. The hunter normally has to row from the hunting blind and place the duck on the circular path to be traversed. I have invented a radio-controlled decoy for use on water which is controlled from a conventional model airplane control transmitter and which may be initiated in its course from the shore or from the blind. By means of the transmitter the course of the decoy may be changed to avoid obstacles and to simulate with accuracy the movements of a feeding duck or other aquatic game animal.

SUMMARY OF THE INVENTION

The invention contemplates a decoy to be controlled from a remote radio transmitter which comprises a hollow animal figure, with a covered entry into the figure, and an external guide means such as a rudder. The decoy has external propelling means responsive to the transmitter and contains a radio receiver, a receiver amplifier and one or more servo mechanisms responsive to the signals received by the receiver. The decoy also contains an electrical power source, such as batteries, and a propelling motor connected through the amplifier to the power source to control the motor output and direction. The first servo mechanism is linked to the guide means. A second servo mechanism operates an external grapple for retrieval of game on the water.

Preferably the animal figure contains an internal flotation member and may also have an external flotation member. The grapple may comprise a hook on a spring wire bent and locked in place by a retracting pin. Alternatively, a pair of grapple arms may be mounted to retract or extend from the body of the figure in response to an internal servo mechanism under the control of the remote transmitter.

An object of the invention is to provide a decoy which may be maneuvered in response to a remote transmitter. Another object of the invention is to provide a powered decoy having means for retrieving downed game.

A further object of the invention is to provide a floating decoy with flotation means precluding submersion of the decoy.

The invention achieves the objectives set forth above in a decoy fabricated from conventional components combined in unique fashion. As a result the decoy is relatively inexpensive to manufacture and responds precisely to commands from the remote radio transmitter.

These and other advantages of the invention are apparent from the following detailed description and drawing.

BRIEF DESCRIPTION OF THE DRAWING

FIG. 4 is a plan view, partly in section and to an enlarged scale, of the embodiment of FIG. 2;

FIG. 5 is a fragmentary sectional elevation taken along line 5—5 of FIG. 4;

FIG. 7 is a schematic plan view of the grapple arms of the embodiment of FIG. 6.

In the various Figures like elements are indicated by like reference numbers.

DESCRIPTION OF THE PREFERRED EMBODIMENTS

Figure 1:
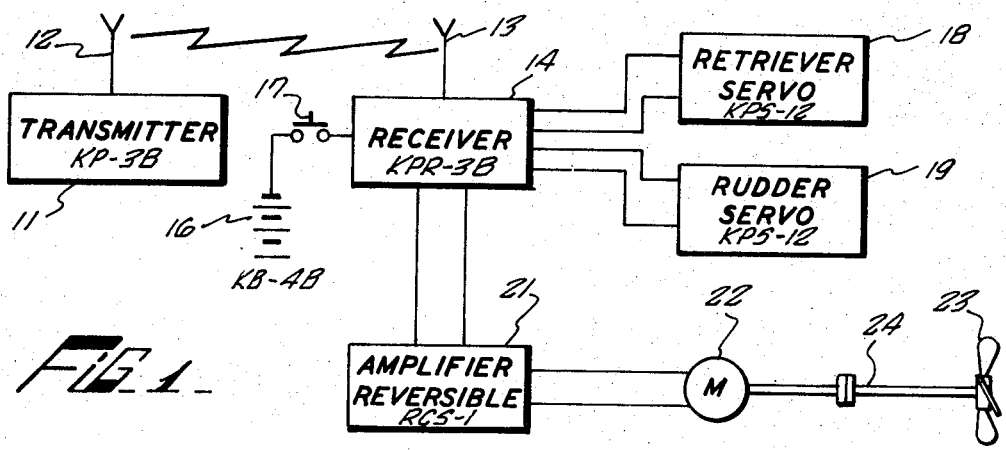
FIG. 1 is a schematic logic diagram showing the basic components of the electrical and electronic system.

In FIG. 1 the schematic electronic and electrical setup for the decoy of the invention is illustrated. A portable transmitter 11 with an antenna 12 transmits a signal to an antenna 13 which is a part of a receiver 14 situated within the decoy. The receiver is powered from a battery source 16 which is controlled by a switch 17 exterior of the decoy. The receiver is electrically connected to a pair of servo mechanisms like a retriever servo 18 and a rudder servo 19. The receiver is also connected to a reversible amplifier 21 which supplies current to a motor 22 which is coupled to a drive means such as a propeller 23 by a shaft 24 coupled to the motor.

In operation the transmitter is manipulated by the operator such that the signal received by the receiver is passed to the retriever servo, the rudder servo or the motor amplifier, depending upon the manipulation of the transmitter in conventional fashion.

The transmitter may be a conventional control transmitter such as that used with model airplanes and model scale automobile racers. One such transmitter is manufactured by Kraft and is known as the Series 71 which operates in the vicinity of 71 m.c. It has been found that a KP3B transmitter used in combination with a KPR-3B receiver is capable of precise control of the two servo mechanisms and the motor amplifier at distances practicable for the performance of the decoy in hunting situations.

The KPS-12 servo may be used for both the retriever and the rudder controls. An RCS-1 amplifier, which is reversible, has controlled a 6-volt D.C. geared motor such as that made by Faulhaber in precise guidance and retrieving operations. The Faulhaber motor is electrically reversible and basically operates at 16,000 r.p.m. geared to produce 2 ½ oz. of torque delivered to the propeller shaft.

Under the control of the transmitter, the retriever servo may be actuated to release the grapple remote from the operator and the rudder servo may be actuated to turn the rudder right or left to guide the decoy as it is urged along by its propelling mechanism.

Figure 3:
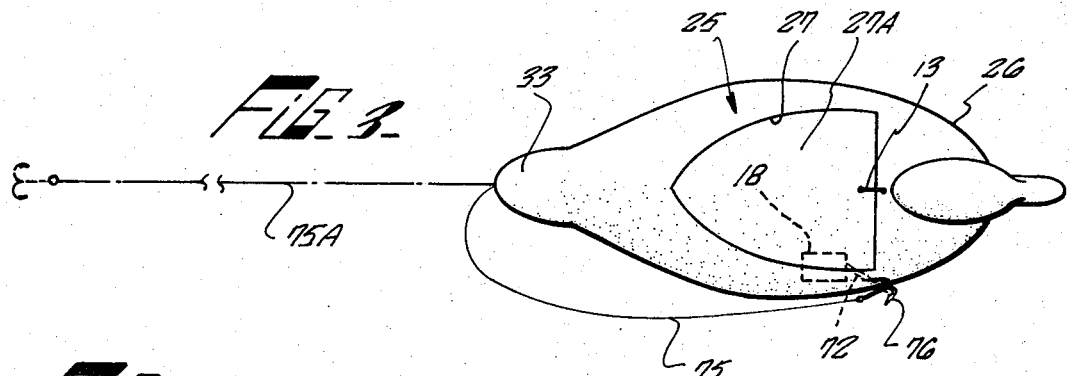
FIG. 3 is a plan view of the embodiment of FIG. 2.
Figure 2:
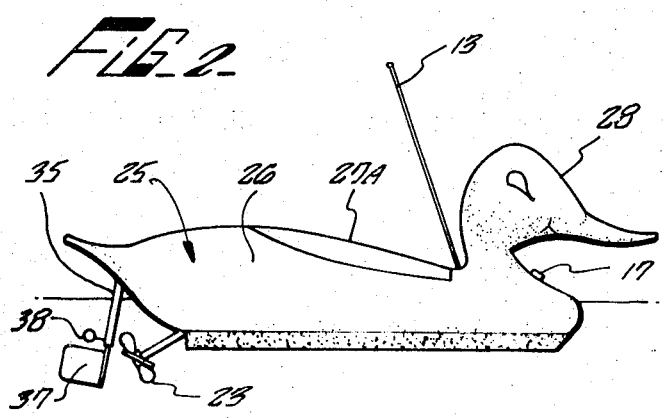
FIG. 2 is a side elevation of a decoy in accordance with the invention.

In FIGS. 2 and 3 an embodiment of the invention is shown in which a decoy 25 has the animal form of a duck. The duck body 26 has an access opening 27 covered by a lid 27A which may be suitably sealed against the accidental incursion of water. A receiver antenna 13 projects above the head 28 of the animal figure. In some instances the antenna may be concealed within the body or arranged at a different attitude such that its appearance is not as noticeable.

The on-off switch 17 controlling the power supply 16 is located beneath the head of the duck on the breast thereof, as indicated in FIG. 2. This switch is manually operated by the user prior to launching the decoy from the transmitting point.

The decoy 25 of FIGS. 2 and 3 is further detailed in FIGS. 4 and 5. As can be seen from those Figures, the body has a hollow shell 31 which terminates forwardly in the head and breast of the duck and rearwardly in a tail simulation 33. A rear wall 34 supports a downwardly depending tube 35 through which a rudder shaft 36 extends. A simple rudder 37 is fixed at the bottom of the shaft to rotate therewith. A towing hook 38 may extend from the tube 35 to a towing attachment (not shown) for following decoys to be towed behind the decoy 25.

Tube 35 extends into the interior 39 of the decoy to a height slightly above normal water level 41 which is approximately midway of the decoy. The water level is determined in part by an exterior flotation member 42 which may be of any of the many suitable skinned plastic foams available for this purpose. It has been found that an interior flotation member, such as the member 44, is advantageous for insuring that the decoy with its expensive electronic components is rendered unsinkable.

Maneuverability and speed are enhanced if the flotation is entirely interior.

Turning now to FIG. 4, it can be seen that the battery pack 16 and the retriever servo 18 are fixed on a mounting board 45 to the interior flotation member 44. In like manner receiver 14 and amplifier 22, together with rudder servo mechanism 19, are fixed to a board 46 secured to the interior of the decoy. An antenna tuning winding 48 may be used advantageously within the decoy to increase the precision of reception.

Propeller 23 which propels the decoy is driven by a shaft 51 journalled in a sloping tube 52 which passes through the flotation member 44 and the floor 54 of the decoy at an angle to the horizontal. Motor 22 is supported by a bracket 56 which is fixed to the floor beneath the internal flotation member. Motor leads, such as the leads 57, 58, connect to the reversible amplifier 21. The upper end 59 of the shaft tube 52 is preferably above the water level 41 at which the decoy normally floats. A coupling 61 links the motor drive shaft to the propeller shaft 51.

In every instance where the tubes 35 and 52 or the bracket rivet 62 penetrate the wall of the decoy figure, suitable sealants or adhesives are applied to waterproof the passage point.

Each of the servo motors 18, 19 has a crank arm 65 which moves arcuately in either direction in response to signals imposed upon the servo motor. The arm 65 of servo 19 is linked to a lever arm 67 on the rudder shaft 36 by a bent link 68 and a turnbuckle end 69. A similar turnbuckle end 71 is pivotally fastened to the arm 65 of servo 18 and is threadably engaged with a grapple latch 72. The latch may be extended or withdrawn in response to servo actuation.

The steering of the decoy when under way is achieved through servo 19 and the linkage to the rudder shaft 36. The speed of the motor is controlled as well as its direction, through the reversible amplifier 21. Thus both the course and the pace of the decoy may be determined by the operator at the transmitter 11.

Returning to FIG. 3, the decoy 25 is shown with a spring wire 75 fixed to tail 33 is suitable fashion. The wire terminates away from the tail in a multiple hook grapple 76. Servo 18, shown in dotted lines, is engaged with latch 72 where it emerges from the decoy. The latch engages one of the grapple hooks 76A at the end of the arched wire 75. When the servo is actuated to withdraw the latch 72, the spring wire 75 is released to assume a trailing position shown at 75A in broken lines. The decoy can then be remotely maneuvered into position for the grapple to engage the feathers or fur of the downed animal and the decoy then tows the prize to the operator at the transmitter, or to any other convenient spot.

Figure 6:
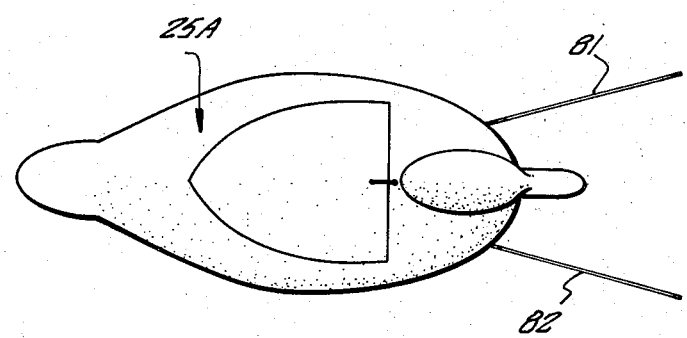
FIG. 6 is a plan view of an alternate embodiment of the invention.

In FIG. 6 an alternate embodiment of the invention is shown in which a decoy 25A similar in most respects to the embodiment of FIG. 2 employs forwardly extending grapple arms 81, 82 to push the retrieved game. In FIG. 6 the arms are in position to engage floating game between them such that the decoy may be maneuvered to retrieve the downed animal.

It is desirable that the arms be partially or totally concealed when not in use such that the appearance of the decoy from afar is as natural as possible. Means are therefore provided to retract and extend the arms with respect to the decoy body. One apparatus adapted to such usage is shown schematically in FIG. 7 in which a servo motor 18A has an elongate arm 65A which the servo swings in an arc about a vertical pivot 84. The end of the arm remote from pivot 84 has an elongate slot 85. A pin 86 secures both of two connecting rods 87, 88 for pivotal motion within the slot. The pin is also free to move along the slot. Each grapple arm 81, 82 is fixed to a vertical pivot 89 which extends upwardly through the floor 54 of the decoy. The pivots are suitably bushed and sealed at the point of passage through the floor. At the top of each pivot a lever arm 91 is fixed to the pivot. Connecting rods 87, 88 each link to the lever arm of their respective pivots such that motion of the servo arm 65A causes each pivot 89 to move the grapple arm arcuately between the extended position of FIG. 6 and the retracted position of FIG. 7. The extended position is also shown in dotted lines for each grapple arm at 81A and 82A in FIG. 7.

The springloaded grapple of FIG. 3 is simple in operation but must be manually reloaded into concealed or retracted position after each extension. The embodiment of FIG. 6, in contrast, may be remotely positioned in retracted or extended attitudes repeatedly from the transmitter. Other springloaded actuation combinations and arcuate motions of the grapple arms are within the contemplation of the invention although not specifically illustrated.

In like manner other variations within the scope of the invention may occur to those skilled in the art. It is therefore desired that the invention be measured by the appended claims rather than by the purely illustrative embodiments shown and described herein.

I claim:

1. A decoy controlled from a remote transmitter and comprising a hollow animal figure, a covered entry into the figure, external guide means, external propelling means, an electrical power source, a receiver responsive to the transmitter, a receiver-amplifier, a first servo mechanism responsive to the receiver, a second servo mechanism responsive to the receiver, a motor, means on the amplifier connecting the power source and the motor to control the motor output, means connecting the motor to the propelling means, linkage between the first servo mechanism and the guide means, a grapple external of the figure having extending and retracted positions, and means responsive to the second servo mechanism adapted to retain the grapple in retracted position.

2. A radio-controlled decoy in accordance with claim 1 further comprising an internal flotation member having a buoyancy factor exceeding the negative buoyancy of the decoy.

3. A decoy in accordance with claim 2 further comprising an external flotation member beneath the animal figure.

4. A decoy in accordance with claim 1 further comprising a towing attachment fixed at the rear of the animal figure.

5. A decoy in accordance with claim 1 wherein the external grapple comprises a resilient wire fixed to the animal figure, a grapple hook at the opposite end of the wire, and a locking pin extending from the animal figure with which the grapple hook is engageable, said lock pin being retractable by the second servo mechanism.

6. A decoy in accordance with claim 1 wherein the external grapple comprises a pair of grapple arms, a pair of substantially vertical pivots extending from the animal figure at spaced intervals, each grapple arm being fixed to the external end of a pivot, lever arms extending from the pivots internally of the animal figure, an actuating rod attached to each lever arm, a power arm on the second servo mechanism means linking each rod to the power arm such that each lever arm moves in an arc to turn its respective pivot to extend and retract the horizontal grapple arm externally attached to the pivot between retracted and extended positions in response to the servo mechanism, the extended positions of the grapple arms being divergent from the pivots and forward of the animal figure.

7. A decoy in accordance with claim 1 wherein the external grapple comprises a pair of grapple arms extending horizontally from the animal figure at spaced intervals, a power arm on the second servo mechanism adapted to extend and retract the horizontal grapple arms, the extending positions of the grapple arms being respectively divergent and forward of the animal figure.

* * * * *